UNITED STATES PATENT OFFICE.

ARNOLD A. HORLICK, OF MILWAUKEE, WISCONSIN.

BEVERAGE MATERIAL AND THE PROCESS OF MAKING SAME.

1,384,894.     Specification of Letters Patent.     Patented July 19, 1921.

No Drawing.     Application filed February 16, 1920. Serial No. 358,868.

*To all whom it may concern:*

Be it known that I, ARNOLD A. HORLICK, a citizen of the United States, and resident of Milwaukee, in the county of Milwaukee and State of Wisconsin, have invented certain new and useful Improvements in Beverage Materials and the Processes of Making Same; and I do hereby declare that the following is a full, clear, and exact description thereof.

My invention pertains to a new beverage material and to the improved process of manufacturing the same.

The primary object of this invention is to produce a normally solid beverage material which is easily and completely soluble in water or milk so that a beverage can be quickly and easily prepared.

A further object of the invention is to produce a beverage material of such nature that the beverage made therefrom will be very high in vitamins and will contain certain stimulating compounds which the usual beverage, as well as many foods, do not contain, such as lecithin.

It is further a very important object to produce a beverage material which will be practically as perfect a food as is possible to obtain, the nutritive values of which are very high and which is rich in proteids, fats and carbohydrates, or in other words those constituents which are recognized as being most beneficial to persons in general and children in particular.

It is a more particular object of the invention to provide a beverage material which contains the soluble constituents of oats in combination with milk.

With these general objects in view, the invention resides in the manner of mixing and treating the materials to be hereinafter set forth in the manner described.

In preparing my improved beverage material I mix together fifty pounds of choicest oats malted, and a like quantity of crushed oats or oat flour, and after they are thoroughly mixed one hundred gallons of water are added. The mixture is agitated and permitted to steep at a temperature of 65 degrees for one-half hour. Thereafter in order to render the nitrogenous substance, such as the albuminoids and albuminates soluble, the temperature is raised to about ninety degrees, but not above one hundred degrees, and the mixture is maintained at this temperature for two hours, and is continuously agitated.

Additional ingredients, such as one-half per cent. of sodium chlorid, one-half per cent. of potassium bicarbonate and one-half per cent. of sodium bicarbonate are added. The mixture of oats, water and the last mentioned ingredients are then heated to a temperature of one hundred degrees for twenty minutes or one-half hour, after which the heat is gradually increased to about one hundred fifty-four degrees and maintained between that and one hundred and sixty degrees for three-quarters of an hour, during which time the same is agitated. During this step in the process, practically all of the phosphatic constituents of the mixture are converted into soluble sodium potassium phosphate.

This treatment of the malted oats and crushed oats or oat flour dissolves all but about 20 to 30 per cent of the solid parts thereof, the undissolved portion consisting mainly of cellulose. The liquid is separated from the insoluble material by filtration, being run or conveyed into receiving tanks. The filtered liquid thus contains nothing except soluble extracts.

While this filtered liquid is maintained at a temperature of about 150 degrees, twenty-five gallons of cold fresh cow's milk or a suitable quantity of other milk are added. This temperature is maintained for one-half hour after which the combined liquids are run into a milk condenser.

While in the condenser the liquids are evaporated under vacuum until the solid content thereof is approximately fifty per cent. During the evaporation the steam applied to the condenser heats the liquid therein to approximately 154 degrees, this temperature being gradually increased toward the end of the process to 170 degrees. During the several stages of the process any starch contained in the mixture is converted by the diastase of the malted oats. Therefore this evaporated and concentrated liquid or syrup contains no starches.

The next step in the improved process of forming this new beverage material consists in further evaporating the syrup to its final dry form, this being produced in a vacuum drier into which the syrup is run. During the final stage the material in the drier is continuously agitated and is removed therefrom in porous flakes or lumps which can be later finely pulverized. The moisture content of this dry material is only from one and one-half to two and one-half per cent.

In preparing the material resulting from the foregoing described process for market, the same may be put up in containers in a powdered form or compressed into tablets. In the former case the material is readily soluble in milk or water.

Likewise the material may be flavored to suit the consumer while in its dry state or after it has been made into a beverage. For instance such flavors as cocoa or vanilla may be added as desired. It is preferable that the containers in which the finished material is placed be well stoppered as it readily absorbs atmospheric moisture.

Although this improved beverage material contains the following ingredients in the proportions enumerated, it is to be understood that various other proportions may well be used within the scope of the present invention, and likewise that the different temperatures as set out above may be varied:

50 pounds of choicest oats, malted,
50 pounds of oat flour or crushed oats,
100 gallons of water,
25 gallons of milk,
½ per cent. sodium chlorid,
½ per cent. potassium bicarbonate,
½ per cent. sodium bicarbonate.

Different means for preparing the beverage material may be used, for instance the beverage prepared for infants is different from that for adults. One beverage preparation for the latter is prepared by mixing two or more tablespoons of the powder in sufficient water to make a thick creamy mixture, after which this is briskly stirred into a cup of hot or cold water. Or, if desired, equal parts of fresh milk and water may be used.

I claim:

1. The herein described method of manufacturing a beverage material which consists in mixing malted oats and oat flour, extracting the soluble constituents therefrom, then adding milk thereto, and finally evaporating the major portion of the moisture from the mixture.

2. The herein described method of manufacturing a beverage material which consists in mixing fifty pounds of malted oats with fifty pounds of oat flour and one hundred gallons of water, heating the mixture to dissolve portions of the grain, extracting the constituents thus dissolved, then adding twenty-five gallons of milk, and thereafter removing the moisture from the mixture.

3. The herein described method of manufacturing a beverage material which consists in mixing fifty pounds of malted oats with fifty pounds of oat flour and one hundred gallons of water, heating the mixture to dissolve portions of the grain, adding sodium chlorid, potassium bicarbonate and sodium bicarbonate to said heated mixture, again heating the mixture, filtering the same to remove the undissolved residue, adding twenty-five gallons of milk to the mixture while heated, and thereafter removing the moisture from the complete mixture.

4. A food product of the character set forth containing milk and the soluble constituents of a mixture of malted and unmalted oats.

5. A food product of the character set forth containing milk, the soluble constituents of a mixture of malted and unmalted oats, sodium chlorid, potassium bicarbonate, and sodium bicarbonate.

In testimony that I claim the foregoing I have hereunto set my hand at Milwaukee, in the county of Milwaukee and State of Wisconsin.

ARNOLD A. HORLICK.